United States Patent
Ge et al.

(10) Patent No.: US 12,497,474 B2
(45) Date of Patent: Dec. 16, 2025

(54) IMPACT RESISTANT HYDROPHOBIC HIGH HEAT OPTICAL ACRYLIC COPOLYMERS

(71) Applicant: Trinseo Europe GmbH, Horgen (CH)

(72) Inventors: Jiaxin J. Ge, Lower Providence, PA (US); Sri R. Seshadri, Holland, PA (US)

(73) Assignee: Trinseo Europe GmbH, Pfaeffikon (CH)

( * ) Notice: Subject to any disclaimer, the term of this patent is extended or adjusted under 35 U.S.C. 154(b) by 882 days.

(21) Appl. No.: 17/600,945

(22) PCT Filed: Apr. 2, 2020

(86) PCT No.: PCT/US2020/026370
§ 371 (c)(1),
(2) Date: Oct. 1, 2021

(87) PCT Pub. No.: WO2020/206108
PCT Pub. Date: Oct. 8, 2020

(65) Prior Publication Data
US 2022/0177622 A1 Jun. 9, 2022

Related U.S. Application Data

(60) Provisional application No. 62/829,180, filed on Apr. 4, 2019.

(51) Int. Cl.
 C08J 5/18 (2006.01)
 C08F 220/14 (2006.01)
 G02B 1/04 (2006.01)

(52) U.S. Cl.
 CPC .............. *C08F 220/14* (2013.01); *C08J 5/18* (2013.01); *G02B 1/041* (2013.01)

(58) Field of Classification Search
 CPC ........ C08F 220/14; C08J 5/18; C08J 2333/10; C08J 2451/06; G02B 1/041; C08L 33/10
 See application file for complete search history.

(56) References Cited

U.S. PATENT DOCUMENTS

| | | | |
|---|---|---|---|
| 3,661,994 A | 5/1972 | Hwa et al. | |
| 3,843,753 A | 10/1974 | Owens | |
| 4,521,568 A | 6/1985 | Mori et al. | |
| 4,906,696 A | 3/1990 | Fischer et al. | |
| 5,270,397 A | 12/1993 | Rhein et al. | |
| 7,101,930 B2 | 9/2006 | Martin et al. | |
| 7,795,348 B2 | 9/2010 | Noda et al. | |
| 8,299,168 B2 | 10/2012 | Münzmay et al. | |
| 9,546,266 B2 | 1/2017 | Hanley et al. | |
| 9,546,268 B2 | 1/2017 | Boutillier et al. | |
| 9,725,548 B2 | 8/2017 | Boday et al. | |
| 10,043,930 B2 | 8/2018 | Lefebvre et al. | |
| 11,891,466 B2 | 2/2024 | Ge et al. | |
| 2007/0055017 A1 | 3/2007 | Schultes et al. | |
| 2009/0074695 A1 | 3/2009 | Mahe et al. | |
| 2014/0309395 A1* | 10/2014 | Koike | C08J 5/18 |
| | | | 526/309 |
| 2015/0038634 A1 | 2/2015 | Sun et al. | |
| 2015/0044161 A1 | 2/2015 | Chuang et al. | |
| 2015/0175835 A1* | 6/2015 | Ge | F21V 7/10 |
| | | | 427/163.4 |
| 2017/0298217 A1 | 10/2017 | Doessel et al. | |
| 2018/0362688 A1 | 12/2018 | Bourrigaud et al. | |

FOREIGN PATENT DOCUMENTS

| | | | | |
|---|---|---|---|---|
| CN | 1643008 A | 7/2005 | | |
| CN | 104011097 A | 8/2014 | | |
| CN | 105209548 A | 12/2015 | | |
| DE | 3890136 C2 * | 6/1993 | ............ | C08F 220/14 |
| EP | 2789634 A1 | 10/2014 | | |
| JP | S64-001749 A | 1/1989 | | |
| JP | H02-091107 A1 | 3/1990 | | |
| JP | 02233710 A | 9/1990 | | |
| JP | 2002161112 A | 6/2002 | | |
| JP | 2013-114198 A | 6/2013 | | |
| JP | 2014040553 A | 3/2014 | | |

(Continued)

OTHER PUBLICATIONS

Office Action issued by the U.S. Patent and Trademark Office in the U.S. Appl. No. 17/687,222, mailed Jul. 18, 2024, U.S. Patent and Trademark Office, Alexandria, VA. (22 pages).
Chinese Office Action for Chinese Application No. 202080026085.4, dated Oct. 28, 2022 with translation, 18 pages.
Extended European Search Report for Application No. 20784709.6, dated Dec. 21, 2022, 7 pages.
Extended European Search Report for Application No. 20783818.6, dated Dec. 21, 2002, 7 pages.
Chinese Office Action for Chinese Application No. 202080026708.8, dated Nov. 2, 2022 with translation, 20 pages.

(Continued)

*Primary Examiner* — Kumar R Bhushan
(74) *Attorney, Agent, or Firm* — BUCHANAN INGERSOLL & ROONEY PC

(57) ABSTRACT

The invention relates to impact resistant acrylic copolymers and terpolymers incorporating high Tg, hydrophobic (meth) acrylates and derivatives that have high thermal stability and excellent impact resistance. These copolymers have a Tg of 114-130° C., along with high molecular weight and high impact resistance. The copolymer is found to exhibit high heat resistance, high light transmission, low haze, low moisture uptake, excellent environmental stability, excellent high temperature thermal stability, and excellent mechanical properties, along with excellent UV resistance. The copolymer, or terpolymer may be used in many applications, including, but not limited to automotive parts, lighting pipes, thin wall parts, optical lenses, extruded optical films, (co-) extruded sheets/profiles, thermo-formable sheets, injection molded parts, and composites.

10 Claims, No Drawings

(56) References Cited

FOREIGN PATENT DOCUMENTS

| | | | | |
|---|---|---|---|---|
| JP | 2014205853 A | 10/2014 | | |
| KR | 10-2009-0081338 A | 7/2009 | | |
| KR | 10-2014-0099511 A1 | 8/2014 | | |
| KR | 20170004719 A | 1/2017 | | |
| TW | 201431939 A | 8/2014 | | |
| WO | 8906248 A1 | 7/1989 | | |
| WO | WO-2011062781 A1 * | 5/2011 | ........... | B29C 48/022 |
| WO | 2014054543 A1 | 4/2014 | | |
| WO | 2018152522 A1 | 8/2018 | | |
| WO | WO-2018152541 A1 * | 8/2018 | ............ | B29C 48/04 |
| WO | 2020206108 A1 | 10/2020 | | |
| WO | 2020206113 A1 | 10/2020 | | |

OTHER PUBLICATIONS

Matsumoto et al., "Radical polymerization of 4-tert-butylcyclohexyl methacrylate: polymerization kinetics and polymer properties", Macromolecules, (Mar. 1993), vol. 26, Issue 7, pp. 1659-1665.

Non-Final Office Action issued by the U.S. Patent and Trademark Office in the U.S. Appl. No. 17/600,981, mailed Jun. 5, 2024, U.S. Patent and Trademark Office, Alexandria, VA. (13 pages).

International Search Report and Written Opinion for International Application No. PCT/US20/26370, dated Jun. 30, 2020, 7 pages.

International Preliminary Report on Patentablity for International Application No. PCT/US2020/026377, dated Sep. 28, 2021, 6 pages.

International Preliminary Report on Patentability for International Application No. PCT/2020/026370, dated Sep. 28, 2021, 7 pages.

International Search Report and Written Opinion for International Application No. PCT/US2023/014454, mailed Apr. 25, 2023, 12 pages.

International Search Report and Written Opinion for International Application No. PCT/US2020/026377, dated Jun. 30, 2020, 6 pages.

International Search Report and Written Opinion for International Application No. PCT/US2023/014473, dated May 8, 2023, 11 pages.

Levels of Residual Monomers(s) in Acrylic Polymers, Methacrylate Producers Association, 2019, 4 pages.

Non Final Office Action for U.S. Appl. No. 17/687,199, mailed Apr. 12, 2023, 12 pages.

Office Action issued by the U.S. Patent and Trademark Office in the U.S. Appl. No. 17/600,981, mailed Oct. 9, 2024, U.S. Patent and Trademark Office, Alexandria, VA. (14 pages).

Office Action (Communication pursuant to Article 94(3) EPC) issued Jun. 28, 2024, by the European Patent Office in European Patent Application No. 20 783 818.6-1102. (3 pages).

Office Action (Fifth Office Action) issued Dec. 31, 2024, by the National Intellectual Property Administration, P. R. China in Chinese Patent Application No. 202080026085.4 and an English translation of the Office Action. (26 pages).

Office Action (Notice of Reasons for Rejection) issued Dec. 24, 2024, by the Japan Patent Office in Japanese Patent Application No. 2021-560389 and an English translation of the Office Action. (7 pages).

Office Action (Notice of Reasons for Rejection) issued on Apr. 2, 2024, by the Japan Patent Office in Japanese Patent Application No. 2021-560389, and an English translation of the Office Action. (11 pages).

Office Action issued by the U.S. Patent and Trademark Office in the U.S. Appl. No. 17/687,222, mailed Nov. 27, 2024, U.S. Patent and Trademark Office, Alexandria, VA. (18 pages).

Notice of Allowance issued by the U.S. Patent and Trademark Office in the U.S. Appl. No. 17/600,981, mailed Feb. 13, 2025, U.S. Patent and Trademark Office, Alexandria, VA. (11 pages).

Office Action (Request for the Submission of an Opinion) issued Mar. 19, 2025, by the Korean Intellectual Property Office in corresponding Korean Patent Application No. 10-2021-7035480 and an English translation of the Office Action. (16 pages).

Office Action issued by the U.S. Patent and Trademark Office in the U.S. Appl. No. 17/687,222, mailed Mar. 14, 2025, U.S. Patent and Trademark Office, Alexandria, VA. (16 pages).

Office Action issued by the U.S. Patent and Trademark Office in the U.S. Appl. No. 17/687,222, mailed Jun. 13, 2025, U.S. Patent and Trademark Office, Alexandria, VA. (21 pages).

* cited by examiner

IMPACT RESISTANT HYDROPHOBIC HIGH HEAT OPTICAL ACRYLIC COPOLYMERS

This application is a U.S. National Phase application of PCT International Application No. PCT/US2020/026370, filed Apr. 2, 2020, which claims the benefit of U.S. Provisional Application No. 62/829,180, filed Apr. 4, 2019, each of which are incorporated by reference herein in their entireties for all purposes.

FIELD OF THE INVENTION

The invention relates to impact resistant acrylic copolymers and terpolymers incorporating high Tg, hydrophobic (meth)acrylates and derivatives that have high thermal stability and excellent impact resistance. These copolymers have a Tg of 114-130° C., along with high molecular weight and high impact resistance. The copolymer is found to exhibit high heat resistance, high light transmission, low haze, low moisture uptake, excellent environmental stability, excellent high temperature thermal stability, and excellent mechanical properties, along with excellent UV resistance. The copolymer, or terpolymer may be used in many applications, including, but not limited to automotive parts, lighting pipes, thin wall parts, optical lenses, extruded optical films, (co-)extruded sheets/profiles, thermo-formable sheets, injection molded parts, and composites.

BACKGROUND OF THE INVENTION

Thermoplastic polymers and copolymers, especially (meth)acrylic polymers, have excellent characteristics such as transparency, mechanical properties and processability and are widely used in various fields such as automobile parts, electrical parts, industrial parts, optical materials, various parts of household electrical appliances, aesthetical parts, miscellaneous goods and the like.

High Tg acrylic polymers are useful in applications requiring a high optical clarity and high heat resistance, such as automotive front inner lenses, thin wall parts, lighting pipes, optical protection/retardation films in electronic devices, solar panels/films, home appliance, composites, and others. It is expected the market for high heat acrylic copolymers in automotive LED front inner lenses and thin wall parts will rapidly increase. In addition, high heat acrylic films are also used in LED/OLED displays.

High Tg acrylic copolymers, such as methyl methacrylate/methacrylic acid copolymer are described in US 2018-0362688.

U.S. Pat. No. 10,043,930 describes high Tg acrylic copolymers, using a variety of high Tg comonomers, for use in photovoltaic front sheets.

One problem with standard acrylic copolymers and products is the inability to pass a long-term environmental stability testing such as 85° C./85% RH test, as required for automotive front inner lenses, solar panels, and new optical films in electronics. Most high Tg monomers, such as methacrylic acid are hydrophilic, and its copolymers are not resistant to moisture.

Polymeric articles are often required to have a combination of properties such as excellent resistant to impact, excellent aesthetics—such as transparency or high gloss for opaque articles, and strong resistance to hazing even in high temperature, high humidity environments (commonly referred to as "low water haze"). For many polymeric materials, it is well established in the industry to use low glass transition temperature ($T_g$) rubbery particles to enhance impact performance of the polymeric composition. In particular, the use of spherical multi-layer polymeric particles consisting of a core or an inner shell of rubbery low $T_g$ polymers and an outer shell of a high $T_g$ polymer that is compatible with the host matrix so called "core-shell" impact modifiers have been utilized for several decades for toughening of polymers such as PVC, PLA, PC, acrylics, epoxies and polyesters. (U.S. Pat. Nos. 3,843,753, 3,661,994) For certain acrylic polymers such as polymethylmethacrylate (PMMA) it has been demonstrated that the use of a high $T_g$ core, a low $T_g$ rubbery inner shell and a high $T_g$ outer shell is advantageous for achieving the optimal level of impact performance (U.S. Pat. Nos. 443,103, 4,521,568, 5,270,397).

Unfortunately, it has been demonstrated that the use of core-shell impact-modified particles in polymeric compositions, while improving impact performance, can be detrimental to properties such as gloss, temperature haze (haze realized in a transparent article when temperature is increased above ambient) and water haze resistance. In US2017/0298217 A1 and WO2014/54543, the use of small particle size was shown to improve resistance to water haze, but impact property improvements were modest and no improvements were demonstrated in water haze resistance.

The inventors have now surprisingly solved these problems, and have produced a material capable of passing an environmental stability test, while maintaining a high Tg and high impact resistance. The novel copolymers contain high Tg hydrophobic monomers to increase the hydrophobicity of the copolymer, while maintaining a high Tg and high molecular weight. Selected impact modifiers are added to the hydrophobic, high Tg polymer to improve the impact resistance, with little or no detrimental effect on the mechanical or optical properties. The resulting high molecular weight, high Tg, high optical property copolymer is useful in many different applications requiring high heat, and/or moist environments.

Specifically, hydrophobic co-monomers tert-butyl cyclohexyl (meth)acrylate having a specific cis/trans ratio range, and 3,3,5, trimethyl cyclohexyl(meth)acrylate were found to copolymerize with pMMA to reduce the water absorption and enhance the hydrophobicity. In addition, a high Tg and/or Vicat temperature, high molecular weight was obtained. Films, sheets and articles made with the hydrophobic copolymer exhibited am light transmission of over 91% and a haze of less than 2.5%. The copolymer may include additional monomer units, making it a terpolymer, tetrapolymer, etc.

SUMMARY OF THE INVENTION

The invention relates, in a first aspect, to a high Tg, optically clear, hydrophobic acrylic copolymer composition containing a high Tg copolymer polymerized from 0.1 to 20 weight percent of monomer units chosen from tert-butyl cyclohexyl methacrylate, 3,3,5-trimethylcyclohexyl(meth)acrylate, and a mixture thereof; and from 50 to 80 weight percent methylmethacrylate monomer units, with optionally from 0 to 49.9 weight percent of other monomer units copolymerizable with methylmethacrylate. The copolymer formed has a Tg of from 115° C. to 140° C., preferably from 117° C. to 135° C., and more preferably from 120° C. to 130° C.

In a second aspect of the invention, the high Tg, optically clear, hydrophobic acrylic copolymer composition has a trans/cis ratio in the tert-butyl cyclohexyl methacrylate, and/or 3,3,5-trimethylcyclohexyl(meth)acrylate monomer units of from 30/70 to 85/15, more preferably from 40-60 to 80/20, and most preferably from 50/50 to 75/25.

In a third aspect of the invention, the high Tg, optically clear, hydrophobic acrylic copolymer of any of the above aspects, contains the optional other monomer(s) at from 0.01 to 25 weight percent of a high Tg comonomer. These optional monomers are chosen from methacrylic acid, acrylic acid, itaconic acid, alpha methyl styrene, maleic anhydride, maleimide, isobornyl methacrylate, norbornyl methacrylate, t-butyl methacrylate, cyclohexyl methacrylate, acrylamide and methacrylamide, or mixtures thereof, and especially 0.01 to 6 weight percent, and preferably 0.1 to 4 weight percent methacrylic acid.

In a fourth aspect of the invention the high Tg, optically clear, hydrophobic acrylic copolymer composition of any of the previous aspects may further comprising 50 to 3500 ppm of antioxidant, based on the weight of the copolymer solids.

In a fifth aspect of the invention, the high Tg, optically clear, hydrophobic acrylic copolymer composition of any of the previous aspects has a weight average molecular weight of from 55,000 g/mole to 250,000 g/mole, preferably from 75,000 g/mole to 200,000 g/mole, more preferably from greater than 90,000 g/mole. to 200,000 g/mole.

In a sixth aspect of the invention, the high Tg, optically clear, hydrophobic acrylic copolymer composition of any of the previous aspects, has a TWLT of at least 89%, preferably at least 91% and more preferably at least 92%; and an optical haze of less than 5%, preferably less than 4% and most preferably less than 2.5%, as measured on a 3.2 mm thick plaque, using ASTM method D1003.

In a seventh aspect of the invention, the high Tg, optically clear, hydrophobic acrylic copolymer composition of any of the other aspects has a refractive index of 1.47-1.50 at the wavelength of 589 nm.

In an eighth aspect of the invention, the high Tg, optically clear, hydrophobic acrylic copolymer composition of any of the above aspects is a blend of said high Tg, clear, hydrophobic acrylic copolymer composition with one or more compatible polymers, the high Tg, clear hydrophobic acrylic copolymer composition being present in the blend at from 5 to 95 weight percent, preferably 5 to 75 weight percent, and more preferably at 10 to 60 weight percent of the total polymer solids.

In a ninth aspect of the invention, an article contains the high Tg, optically clear, hydrophobic acrylic copolymer composition of any of the other aspects. The article being a lighting pipe, thin wall parts, optical lens, extruded films, (co-)extruded sheet or profile, a thermo-formable sheet, injection molded parts, a composites, an LED/OLED optical component, a co-extruded profiles used in building & constructions or reflective signage.

DETAILED DESCRIPTION OF THE INVENTION

"Copolymer" is used to mean a polymer having two or more different monomer units, including copolymers, and polymers with three or more different monomers, such as terpolymers and tetrapolymers. "Polymer" is used to mean both homopolymer and copolymers. Polymers may be straight chain, branched, star, comb, block, or any other structure. The polymers may be homogeneous, heterogeneous, and may have a gradient distribution of co-monomer units. All references cited are incorporated herein by reference. As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble faction molecular weight after extraction from gel is used.

By "hydrophobic" as used herein means that a 25 weight percent solution of the copolymer dissolved in toluene, when heated with stirring to 65° C. to form opaque viscous gels-gelation, then allowed to cool to room temperature (23° C.), is optically clear, along with some soft gels. Upon heating to 65° C., the physical gelation occurs throughout the whole "solution" while the viscous "solution" becomes opaque, resulting in a viscous jelly-like material due to two phase separations of hydrophilic copolymers in hydrophobic solvent (such as toluene) at a high temperature (65° C.). In addition, it is a physically reversible process.

By "(meth)acrylic" or "(meth)acrylate" as used herein denotes both the acrylate and the methacrylate.

In one embodiment, the hydrophobic copolymer of the invention passes an 85° C./85% RH test.

The invention relates to an impact-modified copolymer composition of methyl methacrylate and specific hydrophobic, high Tg comonomers. "High Tg monomer" refers to a monomer, that when polymerized produces a polymer having a Tg of greater than 116° C., and preferably greater than 120° C., and more preferably of greater than 130° C. Examples of useful hydrophobic, high Tg monomers include, but are not limited to, tert-butyl cyclohexyl methacrylate as a specific blend range of trans/cis isomers, and 3,3,5-trimethylcyclohexyl(meth)acrylate, and its isomer blends.

Tert-Butyl Cyclohexyl Methacrylate

Tert-butyl cyclohexyl (meth)acrylate has the structural formulas below:

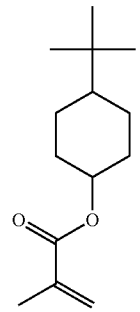

Tert-butyl cyclohexyl methacrylate

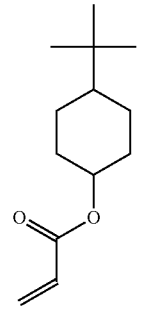

Tert-butyl cyclohexyl acrylate

The monomer is a mixture of the cis- and trans-forms, having a trans/cis ratio of between 30/70 and 85/15, preferably 40/60 to 80/20, and more preferably 50/50 to 75/25.

The level of tert-butyl cyclohexyl (meth)acrylate in the final copolymer generally ranges from 0.2-20 weight percent, and more preferably from 0.5 to 10 weight percent of tert-butyl cyclohexyl methacrylate is used in the copolymer. It has been found that as little as 1 weight percent, and even 0.5 weight percent of tert-butyl cyclohexyl methacrylate, provides a copolymer having a hydrophobic character. The Tg of the copolymer of the invention is from 116° C. to 140° C.

3,3,5-trimethylcyclohexyl(meth)acrylate 3,3,5-trimethylcyclohexyl(meth)acrylate has the structural formulas below:

The monomer is a mixture of the cis- and trans-forms.

The level of 3,3,5-trimethylcyclohexyl(meth)acrylate in the final copolymer generally ranges from 0.2-20 weight percent, and more preferably from 0.5 to 10 weight percent of tert-butyl cyclohexyl methacrylate is used in the copolymer. It has been found that as little as 1 weight percent, and even 0.5 weight percent of tert-butyl cyclohexyl methacrylate, provides a copolymer having a hydrophobic character. The Tg of the copolymer of the invention is from 116° C. to 135° C.

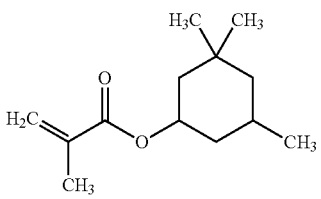

3,3,5-trimethylcyclohexyl methacrylate

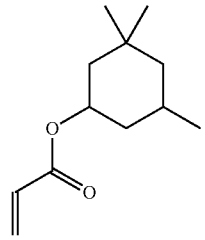

3,3,5-trimethylcyclohexyl acrylate

The level of tert-butyl cyclohexyl methacrylate or 3,3,5-trimethylcyclohexyl methacrylate in the final copolymer generally ranges from 0.2-20 weight percent, and more preferably from 0.5 to 10 weight percent based on the total monomer units in the copolymer. It has been found that as little as 1 weight percent, and even 0.5 weight percent of tert-butyl cyclohexyl methacrylate, provides a copolymer having a hydrophobic character. The Tg of the copolymer of the invention is from 116° C. to 140° C.

Acrylic monomers, MMA

One or more of the hydrophobic, high Tg monomers, is copolymerized with one or more other monomers. In a preferred embodiment of the invention the copolymer contains at least 50 weight percent of methylmethacrylate monomer units, preferably at least 70 weight percent and more preferably at least 80 weight percent methylmethacrylate monomer units make up the copolymer.

The copolymer of the invention, in addition to the hydrophobic, high Tg monomer(s), and methyl methacrylate, may include 0 to 49.5 weight percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture. In addition to carboxyl functionality, other functionality can be added to the high molecular weight acrylic process aid through functional comonomers, including epoxy (such as glycidyl methacrylate), hydroxyl, and anhydride functional groups. Functional monomer units (monomer units having a functional group) can be present at up to 70 weight percent of the acrylic polymer, preferably up to 50 weight percent.

In a preferred embodiment, the acrylic copolymer has a high Tg of greater than 115° C., more preferably greater than 120° C., greater than 125° C., greater than 130° C., greater than 135° C., and even greater than 140° C. In addition to the tert-butyl cyclohexyl methacrylate and 3,3,5-trimethylcyclohexyl(meth)acrylate, other high Tg monomers may optionally be present at levels of 0 to 25 weight percent, and more preferably from 0 to 10 weight percent. The other high Tg monomers may be hydrophilic, hydrophobic or have a neutral character, and include, but are not limited to methacrylic acid, acrylic acid, itaconic acid, alpha methyl styrene, maleic anhydride, maleimide, isobornyl methacrylate, norbornyl methacrylate, t-butyl methacrylate, cyclohexyl methacrylate, acrylamide and methacrylamide.

In one embodiment, a terpolymer of MMA/methacrylic acid and 3,3,5-trimethylcyclohexyl (meth)acrylate provides a useful terpolymer.

In one embodiment it was found that the hydrophobic effect of the tert-butyl cyclohexyl methacrylate and/or 3,3, 5-trimethylcyclohexyl(meth)acrylate is strong enough to overcome the hydrophilic effect of hydrophilic comonomers used at lower levels, to produce an over-all hydrophobic copolymer.

Synthesis Process

The copolymers of the invention are obtained through melt polymerization, including but not limited to solution polymerization, emulsion polymerization, and suspension polymerization.

It was found that the process conditions can have a significant effect on the Tg of the copolymer. In general, solution polymerization of the copolymer was found to produce a higher level of syndiotacticity (~60%) and a higher Tg than those (~50%) in copolymers produced in a melt process. In a lab solution process run at about 65-75° C., the Tg of the copolymer was found to be about 124° C. In a pilot plant melt polymer process run at about 160° C., the Tg was found to be about 116° C. While not being bound by any particular theory, it is believed that the difference in copolymer Tg is related to the syndiotacticity percentage, which is higher at a lower process temperature. In addition, toluene used in solution polymerization may have different chemical environments.

Impact Modifiers

The composition of the invention is impact-modified. Impact modifiers useful in the invention must be miscible, semi-miscible or compatible with the copolymer matrix, to ensure a homogeneous distribution of the impact modifier in the matrix copolymer. Useful impact modifiers include block copolymers, graft copolymers, and core/shell impact modifiers. In one embodiment, for compositions with high optical clarity, the impact modifiers are refractive-index matched to the matrix polymer. By refractive index matched means the difference in refractive index between the impact modifiers and matrix copolymer is plus or minus 0.02 or less, preferably less than 0.01, and most preferably less than 0.05.

In a preferred embodiment, the impact modifier comprises at least 50 weight percent of acrylic monomer units. The impact modifier may be present at a level of from 5 to 60, and more preferably from 10 to 50 weight percent, based on the total layer of matrix polymer and all additives. The level of impact modifier can be adjusted to meet the toughness needs for the end use of the composition. Core-shell impact modifiers are multi-stage, sequentially-produced polymer having a core/shell particle structure of at least two layers. In one embodiment, the core-shell impact modifier has a soft (elastomeric) core, and a hard shell (greater than a Tg of 20° C.). Preferentially, the core-shell modifier comprises at least three layers made of a hard core layer, one or more intermediate elastomeric layers, and a hard shell layer. Preferably the impact modifier is a core-shell structure, in which the shell contains at least 50 weight percent of methyl methacrylate monomer units. In one embodiment, the core-shell impact modifier has a hard core (with a Tg greater than 30° C., and more preferably greater than 50° C.).

Nanostrength® block copolymers from Arkema which self-assemble on a nano-scale, provide for efficient impact modification, and have less of a detrimental effect on the viscosity and optical clarity of the composition. These block copolymers can be used as the sole impact modifier at levels of 3 to 60 weight percent, and preferably from 5 to 45 weight percent. They can also be efficiently used in combination with one or more types of core-shell impact modifiers. For example, 2 to 20 weight percent, and preferably 3 to 15 weight percent of Nanostrength® block copolymers, may be combined with 10 to 40 weight percent, and preferably 15 to 35 weight percent of traditional core-shell modifiers, and preferable hard core, core shell impact modifiers.

The impact modifiers of the invention can be melt compounded with the copolymer of the invention, by means known in the art.

Additives

The copolymer of the invention can be blended with typical additives used in thermoplastics. These include, but are not limited to fillers, surface modifying additives, antioxidants, UV screens, processing aids, fibers, lubricant agents, heat stabilizers, flame retardants, synergists, pigments and other coloring agents.

Other polymer additives could include polycarbonates, polyurethanes, polysulfones, polyamides, polyolefin including copolymers and terpolymers based on these polymers, and including linear, branched, block, and grafted polymer structures. Examples of matting agents include, but are not limited to, cross-linked polymer particles of various geometries. The amount of filler and additives included in the polymer compositions of each layer may vary from about 0.01% to about 70% of the combined weight of polymer, additives and filler. Generally, amounts from about 5% to about 45%, from about 10% to about 40%, are included.

Antioxidants

In one embodiment, selected antioxidants may be used to improve the thermal stability of the resins at high temperature such as 240-270° C. and reduce the yellowing at high temperature. The loading of the antioxidants in the final resins formulations are at the levels of 50 ppm to 3500 ppm, preferably about 100 ppm to about 2500 ppm based on the total weight of the composition. Non-limiting examples of useful antioxidants include sterically hindered phenols, organophosphites hindered amine light stabilizers (HALS), benzotriazoles, triazines, benzophenones, and cyanoacrylates.

Properties

The novel hydrophobic high heat acrylic materials of the invention are designed to meet the requirement of high light transmission in the visible wavelength region, extremely low haze, high heat resistance, low water/moisture uptake, excellent environmental stability, and excellent mechanical properties, optionally with excellent UV resistance, making them especially useful in certain high heat, high optical clarity applications.

The Tg of the copolymers generally ranges from 115° C. 140° C., preferably from 117° C. to 135° C., and more preferably from 120° C. to 130° C.

The weight average molecular weight of the acrylic copolymers is greater than 55,000 g/mole, preferably greater than 75,000 g/mole, more preferably greater than 90,000 g/mole, and even more preferably greater than 100,000 g/mole. The maximum molecular weight is about 250,000 g/mole, and more preferably about 200,000 g/mole The hydrophobic high Tg copolymers of the invention, including co-, ter-, and tetra-polymers of the invention possess a refractive index of 1.47-1.50 at the wavelength of 589 nm.

The copolymer provides a low moisture adsorption and enhanced hydrophobicity.

The copolymers of the invention have excellent optical properties, with a TWLT of at least 89%, preferably at least 91% and more preferably at least 92%; and an optical haze of less than 5%, preferably less than 4% and most preferably less than 2.5%.

In addition to the above properties, the copolymer of the invention has excellent environmental stability, and excellent mechanical properties, along with excellent UV resistance.

Blends of the high Tg copolymers of the invention with other polymers, and especially acrylic polymers is anticipated by the invention. The high Tg copolymers or terpolymers of the invention (with the refractive index of 1.47-1.50) are optically and physically compatible with many typical optical acrylic copolymers (with a refractive index of about 1.49) in their mixtures and/or combinations through melt processing/solution blends. The copolymer of the invention would typically be blended with other acrylic resins at 5 to 95 weight percent, preferably 5 to 75 weight percent, and more preferably at 10 to 60 weight percent of the total polymer solids.

Blends with other compatible polymers, in all ratios, are also anticipated by this invention. Especially useful compatible polymers for a blend include, but are not limited to, other poly(methyl methacrylate) copolymers such as pMMA-EA and PMMA-MA, poly(styrene-acrylonitrile, SAN), polyvinylidene fluoride, copolymers of vinylidene fluoride and hexafluoropropene, and polylactic acid.

Uses

The copolymers of the invention are thermoplastic, and can be easily shaped into sheets, films, light pipe and lenses The excellent impact resistance, heat stability, high molecular weight, moisture resistance and optical properties, makes the copolymer of the invention especially useful for forming automotive front lenses and automotive black trim, capped stock layers for building and construction, light pipes, solar back sheets, films for digital printing, protection films for reflective signage, diffusing sheets and films for LED lighting applications, optical lenses, optical films for electronics, thermo-formable sheets, injection molded parts, composites, and others.

High heat acrylic films of the invention may be used in LED/OLED displays. If cost-effective OLED technologies are widely used to replace LED/LCD technologies, the number of optical polarizers for OLED may be reduced.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

EXAMPLES

Testing Methods:

Injection molded samples: In the testing below involving injection molded samples or plaques, the plaque sample size was molded at 45 mm (width)×67 mm (length)×3.2 mm (thickness).

Melt flow rate (MFR) measurement: Instron Ceast MF30 equipment was used for polymers in melt flow rate measurements. The die temperature was controlled at 230° C. while the loading cell weight was at 3.8 kg. The dried pellets were used near 20° C. below the $T_g$ over 8 hours.

Gel permeation chromatography (GPC): Waters Alliance 2695 and Waters Differential Refractometer 2410 were used to make polymer molecular weight measurements. Columns were based on two PL Gel mixed C columns and a guard column (7.8 mm I.D.×30 cm, 5 μm). THF (HPLC grade) was selected as a solvent. Temperature was controlled at 35° C. Ten poly(methyl methacrylate) standards were used in the calibration, ranging in $M_p$ (peak molecular weight) from 550 to 1,677,000 g/mole.

Differential scanning calorimetry (DSC): The glass transition temperatures of acrylic polymers were measured at a heating rate of 10° C./minutes in $N_2$ using TA instruments Q2000 DSC, during the second heating. The first heating was used to heat the sample to 170° C. at a heating rate of 10° C./minute, then, the sample was cooled down to 0° C. at a cooling rate of 10° C./minute. The sample weight was controlled at 5-10 mg.

Thermogravimetry (TGA): The thermal decomposition temperatures of acrylic polymers were measured at a heating rate of 10° C./minute in $N_2$ using TA instruments Q5000 TGA. The sample weight was controlled at 5-10 mg. The samples were pre-dried under a vacuum oven at 100° C. overnight.

Total light transmission: The total light transmission was measured from film and/or plaque samples in a transmission mode using Perkin Elmer Lambda 950 with a 150 mm integrating sphere. The selected UV/Vis wavelength range was from 200 nm to 800 nm in UV/Vis region.

Haze: Optical haze of clear film and/or plaque samples was measured using BYK HazeGard Plus under ASTM method D1003.

Tensile strength and elongation: The tensile strength, modulus and elongation of the tensile bars was evaluated using Instron Model 4202 at the crosshead speed of 5 mm/minute using ASTM D638 method after being preconditioned at 23° C./48 hours. The tensile was at 6" in length while the width was at 0.50". The sample thickness was at 0.125".

Refractive index: Refractive index of the polymer film was measured at three different wavelengths of 402 nm, 518 nm, and 636.5 nm using an optical prism coupler Metricon 2010 from Metricon Inc while the refractive index was calculated at a selected wavelength of 589 nm.

NMR: Samples were prepared by dissolving 200 mg of pellets in ~4 ml $CDCl_3$ in separate 10 mm NMR tubes for $^{13}C$ NMR. The $^1H$ spectra were acquired on the Bruker AV III HD 500 (11.07 T) spectrometer with a 5 mm $^1H/^{19}F/^{13}C$ TXO probe at 25° C. before and after derivatization of MAA. The $^{13}C$ spectra were acquired on the Bruker AV 400 (9.4 T) with a 10 mm BBO probe at 50° C.

Vicat softening temperatures: The samples were tested in Instron HV6M under 10N and 50N external forces using ASTM method D1525. The sample heating rate was controlled at the speed of 50° C./hour. The injection molded samples were annealed at ~20 C below the Tg value for 16 hours and were kept in a desiccator oven before testing.

Water absorption: The injection molded samples were immersed in a D. I. water bath (23° C.) using ASTM method D570. The water absorption value was measured based on the weight gain while the sample surfaces were cleaned up with dry tissues.

Water haze: The injection molded plaque samples were immersed in a D. I. water bath at a selected temperature such as 60° C. The plaque sample size was molded at 45 mm (width)×67 mm (length)×3.2 mm (thickness). The water haze was measured with a BYK HazeGard after the water on the sample surfaces was cleaned up with dry tissues.

Notched Izod impact: Notched Izod impact strength or resistance was measured using ASTM D256 method with a 1.0 J impact hammer at 21° C./50% relative humidity. The notched Izod bars were injection-molded at the size of 10.2 mm (width)×100 mm (long)×3.2 mm (thick).

pMMA-Co-Tert-Butyl Cyclohexyl Methacrylate

Example 1 (Comparative, MW1805 with no impact modifier, Tg=119° C.). This example demonstrates the preparation of a high molecular weight copolymer of methyl methacrylate and tert-butyl cyclohexyl methacrylate, containing 73% trans/27% cis isomer ratio). 98,660 parts of methyl methacrylate and 1,000 parts of tert-butyl cyclohexyl methacrylate were charged in to a reaction vessel near 0° C. under $N_2$ with a mechanical stirring speed of 100 rpm. In addition, Luperox® 531 (from Arkema) was used as an initiator at a level of 16 parts while 320 parts of n-dodecyl mercaptan (n-DDM from Aldrich) was used as a chain transfer agent. The polymerization reaction occurred at 160° C. for 6 hours. When the conversion reached near 50%, the residual monomers were removed through a venting system. The resulting polymer was passed through a single-screw extruder at a die temperature of 235° C. while the barrel temperatures were at 230-250° C. The melt stream went through a water bath before the pelletization. Then the polymer was pelletized into 3-4 mm long resin pellets and dried at 100° C. in a desiccator oven for 8 hours. The melt flow rate of the polymer was measured to be 2.1 g/10 minutes at 230° C. under 3.8 kg. The refractive index of the resulting polymer was measured at 1.491 at 589 nm.

The resulting polymer was confirmed using $^1H$ NMR to possess the composition of pMMA/tert-butyl cyclohexyl methacrylate (99.1/0.9 w/w). The syndiotacticity of the copolymer was determined at 50% from the chemical shift of 44.5 ppm using $^{13}C$ NMR while the isotaticity and atacticity were measured at 8% and 42% from 45.5 ppm and 45.0 ppm. The glass transition temperature of the resin was measured to be 119° C. in $N_2$ using DSC at the heating rate of 10° C./minute while the Vicat temperature was detected at 120° C. under 10N. The weight average molecular weight Mw of the resin was measured as being 105,000 g/mole using GPC along with a Mw/Mn (polydispersity) value of 1.8. The light transmission from a 3.2 mm plaque was measured to be 92.1% at 560 nm using Lambda 950 while the haze was measured to be 0.6% at 3.2 mm thickness, using a hazemeter (Haze Gard Plus from BYK). The tensile modulus of the test sample was 3.2 GPa while the tensile strength was 77 MPa, along with a tensile elongation of 9.5%. Water absorption was measured at 1.26% by weight gain percentage. Notched Izod impact strength was measured at 2.1 $kJ/m^2$.

Example 2 (MW1805 copolymer with 40% impact modifier with Tg=-117° C.). This example demonstrates the preparation of a high molecular weight copolymer of methyl methacrylate and tert-butyl cyclohexyl methacrylate (containing 73% trans/27% cis isomer) 99.1/0.9, along with a commercial core-shell acrylic impact modifier (40% MPD85T from Altuglas).

High Tg hydrophobic acrylic resins (Tg=119° C.) were compounded with core-shell impact modifiers having a particle size of 250-300 nm to form impact acrylic resins using a twin-screw extruder with the compounding speed of 50 lbs/hour at a die temperature of 230° C. UV stabilizer was also added into the formulation through pre-blending in the compounding. The compounded acrylic pellets were cut through a water bath at ambient temperature and dried at 100° C.

TABLE 1

| Example 2 | Suppliers | Amount (parts) |
|---|---|---|
| Acrylic copolymer | Arkema | 5885 |
| Core Shell Impact Modifier | Arkema | 4000 |
| Tinuvin ® 234 | BASF | 100 |
| Irganox ® 1010 | BASF | 10 |
| Irgafos ® 126 | BASF | 5 |

The melt flow rate of the resulting polymer was measured to be 0.8 g/10 minutes at 230° C. under 3.8 kg. The refractive index of the resulting polymer was measured at 1.491 at 589 nm. The glass transition temperature of the resin was measured to be 117° C. in $N_2$ using DSC at the heating rate of 10° C./minute while the Vicat temperature was detected at 117° C. under 10N. The weight average molecular weight Mw of the resin was measured as being 105,000 g/mole using GPC along with a Mw/Mn (polydispersity) value of 1.8. The light transmission from a 180 um film was measured to be 92.2% at 560 nm using Lambda 950 while the haze was measured to be 2.5% at 3.2 mm using a hazemeter (Haze Gard Plus from BYK). The tensile modulus of the test sample was 2.0 GPa while the tensile strength was 47 MPa, along with a tensile elongation of 64%. Water absorption was measured at 1.45% by weight gain percentage. Notched Izod impact strength was measured at 4.5 $kJ/m^2$.

Example 3 (MW1806 copolymer with 40% impact modifier plus 5% Nanostrength® MS50 with Tg=~116° C.). This example demonstrates the preparation of a high molecular weight copolymer MW1806 of methyl methacrylate and tert-butyl cyclohexyl methacrylate (containing 73% trans/27% cis isomer)-97.5/2.5, along with the commercial core-shell acrylic impact modifier (40% MPD85T from Altuglas) and 5% Nanostrength® MS50 (from Arkema). The weight average molecular weight Mw of the resin was measured as being 100,000 g/mole using GPC along with a Mw/Mn (polydispersity) value of 1.8.

TABLE 2

| Example 3 | Suppliers | Amount (parts) |
|---|---|---|
| Acrylic MW1806 | Arkema | 5485 |
| Core Shell Impact Modifier | Arkema | 4000 |
| Nanostrength ® M550 | Arkema | 500 |
| Irganox ® 1010 | BASF | 10 |
| Irgafos ® 126 | BASF | 5 |

High Tg hydrophobic acrylic resins (Tg=118° C.) made at Arkema were compounded with core-shell impact modifiers having a particle size of 250-300 nm to form impact acrylic resins using a twin-screw extruder with the compounding speed of 50 lbs/hour at a die temperature of 210° C. UV stabilizer was also added into the formulation through pre-blending in the compounding. The compounded acrylic pellets were cut through a water bath at ambient temperature and dried at 100° C.

The melt flow rate of the resulting polymer was measured to be 0.9 g/10 minutes at 230° C. under 3.8 kg. The refractive index of the resulting polymer was measured at 1.491 at 589 nm. The glass transition temperature of the resin was measured to be 116° C. in $N_2$ using DSC at the heating rate of 10° C./minute while the Vicat temperature was detected at 117° C. under 10N. The weight average molecular weight Mw of the resin was measured as being 100,000 g/mole using GPC along with a Mw/Mn (polydispersity) value of 1.8. The light transmission from a 170 um film was measured to be 92.3% at 560 nm using Lambda 950 while the haze was measured to be 2.4% at 3.2 mm thickness, using a hazemeter (Haze Gard Plus from BYK). The tensile modulus of the test sample was 1.8 GPa while the tensile strength was 43 MPa, along with a tensile elongation of 78%. Water absorption was measured at 1.43% by weight gain percentage. Notched Izod impact strength was measured at 3.4 $kJ/m^2$.

Example 4 (MW1806 copolymer with 40% impact modifier with Tg=~116° C.). This example demonstrates the preparation of a high molecular weight copolymer MW1806 of methyl methacrylate and tert-butyl cyclohexyl methacrylate (SR218 from Sartomer, containing 73% trans/27% cis isomer)-97.5/2.5, along with the commercial core-shell acrylic impact modifier (40% MPD85T from Altuglas). The weight average molecular weight Mw of the resin was measured as being 100,000 g/mole using GPC along with a Mw/Mn (polydispersity) value of 1.8.

TABLE 3

| Example 4 | Suppliers | Amount (parts) |
|---|---|---|
| Acrylic MW1806 | Arkema | 5885 |
| Core Shell Impact Modifier | Arkema | 4000 |
| Tinuvin ® 234 | BASF | 100 |
| Irganox ® 1010 | BASF | 10 |
| Irgafos ® 126 | BASF | 5 |

High Tg hydrophobic acrylic resins (MW1806, Tg=118° C.) made at Arkema were compounded with core-shell impact modifiers having a particle size of 250-300 nm to form impact acrylic resins using a twin-screw extruder with the compounding speed of 50 lbs/hour at a die temperature of 210° C. UV stabilizer was also added into the formulation through pre-blending in the compounding. The compounded acrylic pellets were cut through a water bath at ambient temperature and dried at 100° C.

The melt flow rate of the resulting polymer was measured to be 0.75 g/10 minutes at 230° C. under 3.8 kg. The refractive index of the resulting polymer was measured at 1.491 at 589 nm. The glass transition temperature of the resin was measured to be 116° C. in $N_2$ using DSC at the heating rate of 10° C./minute while the Vicat temperature was detected at 118° C. under 10N.

The light transmission from a 180 um film was measured to be 92.3% at 560 nm using Lambda 950 while the haze was measured to be 2.5% at 3.2 mm thickness, using a hazemeter (Haze Gard Plus from BYK). The tensile modulus of the test sample was 1.8 GPa while the tensile strength was 46 MPa, along with a tensile elongation of 64%. Water absorption was measured at 1.44% by weight gain percentage. Notched Izod impact strength was measured at 4.4 kJ/m².

Example 5 (MW1806 copolymer with 45% impact modifier with Tg=~115° C.). This example demonstrates the preparation of a high molecular weight copolymer MW1806 of methyl methacrylate and tert-butyl cyclohexyl methacrylate (SR218 from Sartomer, containing 73% trans/27% cis isomer)-97.5/2.5, along with the commercial core-shell acrylic impact modifier (45% MPD85T from Altuglas). The weight average molecular weight Mw of the resin was measured as being 100,000 g/mole using GPC along with a Mw/Mn (polydispersity) value of 1.8.

TABLE 4

| Example 5 | Suppliers | Amount (parts) |
|---|---|---|
| Acrylic MW1806 | Arkema | 5485 |
| Core Shell Impact Modifier | Arkema | 4500 |
| Tinuvin ® 234 | BASF | 100 |
| Irganox ® 1010 | BASF | 10 |
| Irgafos ® 126 | BASF | 5 |

High Tg hydrophobic acrylic resins (MW1806, Tg=118° C.) made at Arkema were compounded with core-shell impact modifiers having a particle size of 250-300 nm to form impact acrylic resins using a twin-screw extruder with the compounding speed of 50 lbs/hour at a die temperature of 210° C. UV stabilizer was also added into the formulation through pre-blending in the compounding. The compounded acrylic pellets were cut through a water bath at ambient temperature and dried at 100° C.

The melt flow rate of the resulting polymer was measured to be 0.75 g/10 minutes at 230° C. under 3.8 kg. The refractive index of the resulting polymer was measured at 1.491 at 589 nm. The glass transition temperature of the resin was measured to be 115° C. in $N_2$ using DSC at the heating rate of 10° C./minute while the Vicat temperature was detected at 116° C. under 10N.

The light transmission from a 160 um film was measured to be 92.3% at 560 nm using Lambda 950 while the haze was measured to be 2.5% at 3.2 mm thickness using a hazemeter (Haze Gard Plus from BYK). The tensile modulus of the test sample was 1.8 GPa while the tensile strength was 45 MPa, along with a tensile elongation of 85%. Water absorption was measured at 1.50% by weight gain percentage. Notched Izod impact strength was measured at 5.4 kJ/m².

Example 6 (MW1810 copolymer with 40% impact modifier with Tg=~122° C.). This example demonstrates the preparation of a high molecular weight copolymer of methyl methacrylate/tert-butyl cyclohexyl methacrylate (containing 73% trans/27% cis isomer)/MAA 95.9/1.2/2.9, along with a commercial core-shell acrylic impact modifier (40% MPD85T from Altuglas). The weight average molecular weight Mw of the resin was measured as being 101,000 g/mole using GPC along with a Mw/Mn (polydispersity) value of 1.8.

High Tg hydrophobic acrylic resins (Tg=122° C.) were compounded with core-shell impact modifiers having a particle size of 250-300 nm to form impact acrylic resins using a twin-screw extruder with the compounding speed of 50 lbs/hour at a die temperature of 230° C. UV stabilizer was also added into the formulation through pre-blending in the compounding. The compounded acrylic pellets were cut through a water bath at ambient temperature and dried at 100° C.

TABLE 5

| Example 6 | Suppliers | Amount (parts) |
|---|---|---|
| Acrylic copolymer | Arkema | 5885 |
| Core Shell Impact Modifier | Arkema | 4000 |
| Tinuvin ® 234 | BASF | 100 |
| Irganox ® 1010 | BASF | 10 |
| Irgafos ® 126 | BASF | 5 |

The melt flow rate of the resulting polymer was measured to be 0.5 g/10 minutes at 230° C. under 3.8 kg. The refractive index of the resulting polymer was measured at 1.491 at 589 nm. The glass transition temperature of the resin was measured to be 122° C. in $N_2$ using DSC at the heating rate of 10° C./minute while the Vicat temperature was detected at 122° C. under 10N. The weight average molecular weight Mw of the resin was measured as being 100,000 g/mole using GPC along with a Mw/Mn (polydispersity) value of 1.8. The light transmission from a 180 um film was measured to be 92.2% at 560 nm using Lambda 950 while the haze was measured to be 3.5% at 3.2 mm thickness using a hazemeter (Haze Gard Plus from BYK). The tensile modulus of the test sample was 1.8 GPa while the tensile strength was 47 MPa, along with a tensile elongation of 58%. Water absorption was measured at 1.61% by weight gain percentage. Notched Izod impact strength was measured at 4.5 kJ/m².

Example 7 (MW1905 copolymer with 30% impact modifier with Tg=~118° C.). This example demonstrates the preparation of a high molecular weight copolymer MW1905 of methyl methacrylate and tert-butyl cyclohexyl methacrylate (SR218 from Sartomer, containing 62% trans/38% cis isomer)-98.2/1.8, along with the commercial core-shell acrylic impact modifier (30% MPD85T from Altuglas). The weight average molecular weight Mw of the resin was measured as being 100,000 g/mole using GPC along with a Mw/Mn (polydispersity) value of 1.8.

TABLE 6

| Example 7 | Suppliers | Amount (parts) |
|---|---|---|
| Acrylic MW1905 | Arkema | 6944 |
| Core Shell Impact Modifier | Arkema | 3000 |
| Tinuvin ® 234 | BASF | 50 |
| Irganox ® 1010 | BASF | 2 |
| Irgafos ® 126 | BASF | 4 |

High Tg hydrophobic acrylic resins (MW1905, Tg=118° C.) made at Arkema were compounded with core-shell impact modifiers having a particle size of 250-300 nm to form impact acrylic resins using a twin-screw extruder with the compounding speed of 50 lbs/hour at a die temperature of 220° C. UV stabilizer was also added into the formulation through pre-blending in the compounding. The compounded acrylic pellets were cut through a water bath at ambient temperature and dried at 100° C.

The melt flow rate of the resulting polymer was measured to be 1.50 g/10 minutes at 230° C. under 3.8 kg. The refractive index of the resulting polymer was measured at 1.491 at 589 nm. The glass transition temperature of the resin was measured to be 116° C. in $N_2$ using DSC at the heating rate of 10° C./minute while the Vicat temperature was detected at 117° C. under 10N.

The light transmission from a 160 um film was measured to be 92.3% at 560 nm using Lambda 950 while the haze was measured to be 1.7% at 3.2 mm thickness using a hazemeter (Haze Gard Plus from BYK). The tensile modulus of the test sample was 2.2 GPa while the tensile strength was 49 MPa, along with a tensile elongation of 60%. Water absorption was measured at 1.41% by weight gain percentage. Notched Izod impact strength was measured at 4.7 kJ/m².

Example 8 (MW1905 copolymer with 48% impact modifier with Tg=~118° C.). This example demonstrates the preparation of a high molecular weight copolymer MW1905 of methyl methacrylate and tert-butyl cyclohexyl methacrylate (SR218 from Sartomer, containing 62% trans/38% cis isomer)-98.2/1.8, along with the commercial core-shell acrylic impact modifier (48% MPD85T from Altuglas). The weight average molecular weight Mw of the resin was measured as being 100,000 g/mole using GPC along with a Mw/Mn (polydispersity) value of 1.8.

TABLE 7

| Example 8 | Suppliers | Amount (parts) |
| --- | --- | --- |
| Acrylic MW1905 | Arkema | 5144 |
| Core Shell Impact Modifier | Arkema | 4800 |
| Tinuvin ® 234 | BASF | 50 |
| Irganox ® 1010 | BASF | 2 |
| Irgafos ® 126 | BASF | 4 |

High Tg hydrophobic acrylic resins (MW1905, Tg=118° C.) made at Arkema were compounded with core-shell impact modifiers having a particle size of 250-300 nm to form impact acrylic resins using a twin-screw extruder with the compounding speed of 50 lbs/hour at a die temperature of 220° C. UV stabilizer was also added into the formulation through pre-blending in the compounding. The compounded acrylic pellets were cut through a water bath at ambient temperature and dried at 100° C.

The melt flow rate of the resulting polymer was measured to be 0.74 g/10 minutes at 230° C. under 3.8 kg. The refractive index of the resulting polymer was measured at 1.491 at 589 nm. The glass transition temperature of the resin was measured to be 116° C. in $N_2$ using DSC at the heating rate of 10° C./minute while the Vicat temperature was detected at 116° C. under 10N.

The light transmission from a 160 um film was measured to be 92.3% at 560 nm using Lambda 950 while the haze was measured to be 2.4% at 3.2 mm thickness using a hazemeter (Haze Gard Plus from BYK). The tensile modulus of the test sample was 1.7 GPa while the tensile strength was 40 MPa, along with a tensile elongation of 68%. Water absorption was measured at 1.46% by weight gain percentage. Notched Izod impact strength was measured at 6.2 kJ/m².

Comparative Example 1 (DR, copolymer with 48% impact modifier with Tg=-105° C.). This example demonstrates the preparation of a copolymer of methyl methacrylate and ethyl acrylate-94.6/5.4, with Mw of 85,000 g/mol along with the commercial core-shell acrylic impact modifier (45% MPD90 from Altuglas).

Commercial acrylic resins (with Tg=105° C.) made at Arkema were compounded with core-shell impact modifiers having a particle size of 250-300 nm to form impact acrylic resins using a twin-screw extruder with the compounding speed of 50 lbs/hour at a die temperature of 210° C. UV stabilizer was also added into the formulation through pre-blending in the compounding. The compounded acrylic pellets were cut through a water bath at ambient temperature and dried at 85° C.

The melt flow rate of the resulting polymer was measured to be 1.2 g/10 minutes at 230° C. under 3.8 kg. The refractive index of the resulting polymer was measured at 1.491 at 589 nm. The glass transition temperature of the resin was measured to be 105° C. in $N_2$ using DSC at the heating rate of 10° C./minute while the Vicat temperature was detected at 105° C. under 10N.

The light transmission from a 160 um film was measured to be 92.0% at 560 nm using Lambda 950 while the haze was measured to be 2.5% at 3.2 mm using a hazemeter (Haze Gard Plus from BYK). The tensile modulus of the test sample was 1.7 GPa while the tensile strength was 40 MPa, along with a tensile elongation of 72%. Water absorption was measured at 1.52% by weight gain percentage. Notched Izod impact strength was measured at 5.9 kJ/m².

What is claimed is:

1. A composition comprising:
    a) an acrylic copolymer comprising:
        1) From 0.1 to 20 weight percent monomer units chosen from tert-butyl cyclohexyl methacrylate, 3,3,5-trimethylcyclohexyl (meth) acrylate, and a mixture thereof, wherein said tert-butyl cyclohexyl methacrylate and/or 3,3,5-trimethylcyclohexyl (meth) acrylate monomer units have a trans/cis ratio of from 30/70 to 85/15;
        2) from 80 to 99.1 weight percent methylmethacrylate monomer units;
        3) Optionally from 0 to 25 weight percent of other monomer units copolymerizable with methylmethacrylate;
    the weight percents being based on the total monomer units in the acrylic copolymer, wherein said acrylic copolymer has a Tg of from 114° C. to 140° C.; and
    b) from 5 to 60 weight percent of impact modifiers, based on total composition weight, wherein said impact modifiers comprise a core-shell polymer having a hard core with a Tg of greater than 20° C., one or more elastomeric intermediate layers, and at least one hard shell having a Tg of greater than 20° C.,
    wherein the composition has a Total Light Transmission (TLT) of at least 89%,
    wherein the composition has an optical haze of less than 4.0%, as measured on a 3.22 mm thick plaque, using ASTM D1003, and
    wherein the composition has a refractive index of 1.47-1.50 at the wavelength of 589 nm.

2. The composition of claim 1, wherein said other monomer units comprise from 0.01 to 25 weight percent of a high Tg comonomer, comprising at least one of methacrylic acid, acrylic acid, itaconic acid, alpha methyl styrene, maleic anhydride, maleimide, isobornyl methacrylate, norbornyl methacrylate, t-butyl methacrylate, cyclohexyl methacrylate, acrylamide and methacrylamide, and mixtures thereof.

3. The composition of claim 1, wherein said other monomer units comprise from 0.01 to 6 weight percent of methacrylic acid.

4. The composition of claim 1, wherein said acrylic copolymer has a weight average molecular weight of from 55,000 g/mole to 250,000 g/mole.

5. The composition of claim 1, wherein said impact modifiers comprise a self-assembling, nanostructured acrylic block copolymer.

6. The composition of claim 1, wherein said impact modifiers comprise a blend of 1-20 weight percent of a self-assembling, nanostructured acrylic block copolymer, and 5 to 40 weight percent of one or more core-shell impact modifiers, based on the total weight of the composition.

7. The composition of claim 1, further comprising from 5 to 95 weight percent of one or more compatible polymers, based on the weight of the total polymer solids.

8. The composition of claim 1, further comprising 50 to 3500 ppm of one or more antioxidants, based on the weight of the polymer solids.

9. An article comprising the composition of claim 1, wherein said article is at least one of automotive front lenses, thin wall pats, lighting pipes, solar back sheets, optical lenses, optical films for electronics, thermo-formable sheets, injection molded parts, extruded surface layers, (co-)extruded sheets and profiles, and composites.

10. A composition comprising:
a) an acrylic copolymer comprising:
   1) From 0.1 to 20 weight percent monomer units chosen from tert-butyl cyclohexyl methacrylate, 3,3,5-trimethylcyclohexyl (meth) acrylate, and a mixture thereof, wherein said tert-butyl cyclohexyl methacrylate and/or 3,3,5-trimethylcyclohexyl (meth) acrylate monomer units have a trans/cis ratio of from 30/70 to 85/15;
   2) from 80 to 99.1 weight percent methylmethacrylate monomer units;
   3) Optionally from 0 to 25 weight percent of other monomer units copolymerizable with methylmethacrylate;
the weight percents being based on the total monomer units in the acrylic copolymer, wherein said acrylic copolymer has a Tg of from 114° C. to 140° C.; and
b) from 5 to 60 weight percent of impact modifiers, based on total composition weight, wherein said impact modifiers comprise acrylic based core-shell structured copolymers,
wherein the composition has a Total Light Transmission (TLT) of at least 89%,
wherein the composition has an optical haze of less than 4.0%, as measured on a 3.22 mm thick plaque, using ASTM D1003, and
wherein the composition has a refractive index of 1.47-1.50 at the wavelength of 589 nm.

* * * * *